(12) United States Patent
Lu et al.

(10) Patent No.: US 10,628,607 B2
(45) Date of Patent: Apr. 21, 2020

(54) METHOD FOR PROTECTING PIN CODE ON ANDROID PLATFORM

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 218 days.

(21) Appl. No.: 15/710,590

(22) Filed: Sep. 20, 2017

(65) Prior Publication Data

US 2018/0025177 A1  Jan. 25, 2018

Related U.S. Application Data

(63) Continuation of application No. PCT/CN2016/077585, filed on Mar. 28, 2016.

(30) Foreign Application Priority Data

Apr. 22, 2015 (CN) .......................... 2015 1 0192517

(51) Int. Cl.
*G06F 11/30* (2006.01)
*G06F 12/14* (2006.01)
(Continued)

(52) U.S. Cl.
CPC .......... *G06F 21/6245* (2013.01); *G06F 21/31* (2013.01); *G06F 21/602* (2013.01);
(Continued)

(58) Field of Classification Search
None
See application file for complete search history.

(56) References Cited

U.S. PATENT DOCUMENTS 6,945,454 B2   9/2005  Tournemille et al. ........ 235/375
8,494,934 B2 * 7/2013  Atkinson ............. G06Q 10/087
                                                     705/35
(Continued)

FOREIGN PATENT DOCUMENTS

CN   101383833 A    3/2009
CN   104092683 A   10/2014
(Continued)

OTHER PUBLICATIONS

Artho, Cyrille & Oiwa, Yutaka & Hagiya, Masami. Extraction of properties in C implementations of security APIs for the verification of Java applications. (Year: 2009).*

(Continued)

*Primary Examiner* — Jeffrey Nickerson
*Assistant Examiner* — Vadim Savenkov
(74) *Attorney, Agent, or Firm* — J.C. Patents

(57) ABSTRACT

The disclosure provides a method for protecting PIN code on Android platform, including: introducing, by Java layer, start event to C layer after invoked by upper layer; invoking, by C layer, Java layer via JNI to generate a password-storage-class-instance after receiving start event, and invoking Java layer after receiving a handle returned by Java layer to monitor input from user; storing, by Java layer, PIN code data into a instance memory when Java layer monitors PIN code data from user, updating storage location identification, and introducing encrypting event to C layer; introducing, by Java layer, confirming event to C layer when Java layer monitors confirmation information from user; accessing, by C layer, the instance via handle to encrypt the PIN code data when receiving encrypting event; and accessing, by C layer, the instance via handle to decrypt the encrypted data in instance memory to obtain PIN code.

16 Claims, 3 Drawing Sheets

(51) Int. Cl.
*G06F 21/62* (2013.01)
*H04L 9/32* (2006.01)
*G06F 21/31* (2013.01)
*G06F 21/60* (2013.01)
*G06F 21/78* (2013.01)
*G06F 21/83* (2013.01)

(52) U.S. Cl.
CPC .............. *G06F 21/78* (2013.01); *G06F 21/83* (2013.01); *H04L 9/3226* (2013.01); *H04L 9/3228* (2013.01); *G06F 2221/031* (2013.01)

(56) References Cited

U.S. PATENT DOCUMENTS

| | | | | |
|---|---|---|---|---|
| 2004/0039926 A1* | 2/2004 | Lambert | ............... | G06F 21/125 713/189 |
| 2005/0132210 A1* | 6/2005 | Yunus | .................... | H04L 67/34 713/189 |
| 2005/0223392 A1* | 10/2005 | Cox | ...................... | G06Q 10/06 719/328 |
| 2012/0201381 A1* | 8/2012 | Miller | ...................... | H04L 9/16 380/255 |
| 2012/0284526 A1* | 11/2012 | Arnold | ................... | G06F 21/31 713/182 |
| 2014/0090041 A1* | 3/2014 | Kim | .................... | H04L 63/0815 726/7 |
| 2015/0074427 A1* | 3/2015 | Lewis | .................. | H04L 9/0894 713/193 |
| 2016/0119783 A1* | 4/2016 | Zhao | ...................... | G06F 21/62 380/279 |
| 2016/0127336 A1* | 5/2016 | Cignetti | ............... | G06F 21/602 713/171 |
| 2016/0182531 A1* | 6/2016 | Rubakha | .............. | H04L 63/123 726/1 |

FOREIGN PATENT DOCUMENTS

| | | |
|---|---|---|
| CN | 104915602 A | 9/2015 |
| CN | 104915602 B | 8/2017 |
| WO | WO-2005109360 A1 * | 11/2005 ........... G06Q 20/346 |

OTHER PUBLICATIONS

The International Search Report of corresponding International PCT Application No. PCT/CN2016/077585, dated Jul. 4, 2016.

* cited by examiner

METHOD FOR PROTECTING PIN CODE ON ANDROID PLATFORM

CROSS-REFERENCE TO RELATED APPLICATIONS

This application is a continuation of International Application No. PCT/CN2016/077585, filed on Mar. 28, 2016, which claims priority to Chinese Patent Application No. 201510192517.X, filed on Apr. 22, 2015, entitled "METHOD FOR PROTECTING PIN CODE ON ANDROID PLATFORM", both of which are hereby incorporated by reference in their entireties.

TECHNICAL FIELD

The present invention relates to the field of information security and, more particular, to a method for protecting a PIN code on an android platform.

BACKGROUND

Android is an operating system based on a Linux open kernel and an operating system for mobile phones, which is disclosed by Google on Nov. 5, 2007. Currently, Android not only is applied to smart mobile phones, but also becomes more and more popular in the tablet PC market and the smart MP4 market.

Android adopts a framework of software stack, in which, Linux kernel on the under layer just provides basic functions, the interlayer includes a function library and a virtual machine, and on the top layer is various application software. For most application software, a personal identification number (PIN code) needs to be input when the application software is used. Usually the PIN code is encrypted so as to improve the security of the PIN code; but, a user interface (UI) on the Android platform is written in Java which can be decompiled and analyzed easily.

Thus, in prior art, the logic for encrypting the PIN code is placed on a C layer, in which layer, the PIN code is difficult to be cracked and the decompiling and analysis are difficult. A Java layer transmits the PIN code to the C layer when the PIN code is input by a user, but the PIN code may be intercepted in the process of being transmitted from the Java layer to the C layer.

SUMMARY

The present invention provides a method for protecting a PIN code on an Android platform, which protects the PIN code from being intercepted in the process of being transmitted from a Java layer to a C layer.

According to one aspect of the invention, it provides a method for protecting a PIN code on an Android platform, which includes:

Step S1) invoking, by a Java layer, a C layer via a Java native interface (JNI), and introducing a start event to the C layer;

Step S2) invoking, by the C layer, the Java layer via the JNI after the start event is received by the C layer;

Step S3) generating, by the Java layer, a password-storage-class-instance, and returning a handle of the password-storage-class-instance to the C layer via the JNI;

Step S4) invoking, by the C layer, the Java layer via the JNI after the handle of the password-storage-class-instance is received by the C layer;

Step S5) monitoring, by the Java layer, input from a user; if it is monitored that PIN code data is input by the user, storing the PIN code data currently input by the user into a data memory of the password-storage-class-instance, and updating a storage location identification in the password-storage-class-instance, invoking the C layer via the JNI and introducing an encrypting event to the C layer, and executing Step S6; if it is monitored that confirmation information is input by the user, invoking the C layer via the JNI, introducing a confirming event to the C layer, and executing Step S7;

Step S6) accessing, by the C layer, the password-storage-class-instance via the handle of the password-storage-class-instance, looking up the PIN code data input currently by the user according to the storage location identification in the password-storage-class-instance, and then encrypting the found PIN code data input currently by the user to obtain current encrypted data, storing the current encrypted data into the data memory of the password-storage-class-instance, deleting the found PIN code data input currently by the user, and going back to Step S5;

Step S7) accessing, by the C layer, the password-storage-class-instance according to the handle of the password-storage-class-instance, and decrypting all of the encrypted data stored in the data memory of the password-storage-class-instance to obtain a PIN code input by the user.

Before Step S5, the above method further includes: generating, by the Java layer, a password-keyboard-class-instance, relating the password-keyboard-class-instance to the password-storage-class-instance, and invoking a display function in the password-keyboard-class-instance to display an interface for user inputting.

Or, before Step S5, the method further includes: generating, by the Java layer, a password-keyboard-class-instance, relating the password-keyboard-class-instance to the password-storage-class-instance, and invoking a display function in the password-keyboard-class-instance to display an interface for user inputting; the monitoring, by the Java layer, the input from the user includes: monitoring, by the password-keyboard-class-instance of the Java layer, the input from the user; and the storing, by the Java layer, the PIN code data input currently by the user into the data memory of the password-storage-class-instance, and updating the storage location identification in the password-storage-class-instance includes: invoking, by the password-keyboard-class-instance of the Java layer, the password-storage-class-instance, storing the PIN code data input currently by the user into the data memory of the password-storage-class-instance, and updating the storage location identification in the password-storage-class-instance.

Or, Step S1 further includes: generating, by the Java layer, a password-keyboard-class-instance, and invoking a display function in the password-keyboard-class-instance to display an interface for user inputting; before Step S5, the method further includes: relating, by the Java layer, the password-keyboard-class-instance to the password-storage-class-instance; the monitoring, by the Java layer, the input by the user includes: monitoring, by the password-keyboard-class-instance of the Java layer, the input from the user; the storing, by the Java layer, the PIN code data input currently by the user into the data memory of the password-storage-class-instance, and updating the storage location identification in the password-storage-class-instance includes: invoking, by the password-keyboard-class-instance of the Java layer, the password-storage-class-instance, storing the PIN code data input currently by the user into the data memory of the password-storage-class-instance, and updating the storage location identification in the password-storage-class-instance.

In the above method, Step S5 further includes: if the Java layer monitors cancel information being input by the user, invoking the C layer via the JNI, and introducing a cancel event to the C layer; accessing, by the C layer, the password-storage-class-instance according to the handle of the password-storage-class-instance after the cancel event is received by the C layer, and deleting all of the encrypted data in the data memory of the password-storage-class-instance.

Further, after Step S7, the method includes: invoking, by the C layer, the Java layer via the JNI, and releasing, by the Java layer, the password-storage-class-instance; after the accessing, by the C layer, the password-storage-class-instance according to the handle of the password-storage-class-instance and deleting all of the encrypted data in the data memory of the password-storage-class-instance, the method further includes: invoking the Java layer via the JNI, and releasing, by the Java layer, the password-storage-class-instance.

In the above method, Step S5 further includes: if the Java layer monitors deleting information being input by the user, looking up and deleting the latest PIN code data input by the user according to the storage location identification after the storage location identification in the password-storage-class-instance is decreased progressively, and returning to Step S5.

In the above method, the encrypting, the found PIN code data input currently by the user includes: filling the found PIN code data input currently by the user with a random number, and then encrypting the found PIN code data by using a pre-stored key according to a preset algorithm; the decrypting all of the encrypted data stored in the data memory of the password-storage-class-instance includes: decrypting all of the encrypted data stored in the data memory of the password-storage-class-instance by using the pre-stored key according to the preset algorithm.

After the start event is received by the C layer, the above method further includes: generating a current key;

the encrypting the found PIN code data input currently by the user includes: encrypting the found PIN code data input currently by the user by using the current key according to a preset algorithm after the found PIN code data is filled with a random number;

the decrypting all of the encrypted data stored in the data memory of the password-storage-class-instance includes: decrypting all of the encrypted data stored in the data memory of the password-storage-class-instance by using the current key according to the preset algorithm;

after the decrypting all of the encrypted data stored in the data memory of the password-storage-class-instance to obtain the PIN code input by the user, the method further includes: deleting the current key.

After the decrypting all of the encrypted data stored in the data memory of the password-storage-class-instance to obtain the PIN code input by the user, the above method further includes: sending the PIN code input by the user to a smart key device for authentication.

In the above method, the storing the current encrypted data into the data memory of the password-storage-class-instance and deleting the found PIN code data input currently by the user includes: covering the found PIN code data input currently by the user with the current encrypted data.

Before the invoking, by the Java layer, the C layer via the JNI and introducing the encrypting event to the C layer, the above method further includes: determining, by the Java layer, whether a length of data which is to be encrypted reaches a preset length, if yes, invoking the C layer and introducing the encrypting event to the C layer; otherwise, going back to Step S5;

after the storing, by the Java layer, the PIN code data input currently by the user into the data memory of the password-storage-class-instance, the method further includes: updating the length of the data which is to be encrypted;

after the invoking, by the Java layer, the C layer via the JNI and introducing the confirming event to the C layer, the method further includes: initializing, by the Java layer, the length of the data which is to be encrypted.

After the decrypting all of the encrypted data stored in the data memory of the password-storage-class-instance to obtain the PIN code input by the user, the above method further includes: deleting all of the encrypted data;

further, the deleting all of the encrypted data includes: updating all of the encrypted data stored in the data memory of the password-storage-class-instance as preset data or a random number.

The present invention provides a method for protecting a PIN code on an Android platform, in which, an event is interacted between the Java layer and the C layer by using the JNI mechanism instead that the PIN code is transmitted. In this way, the PIN code is protected from being intercepted in the process of being transmitted from the Java layer to the C layer so as to make the PIN code more secure.

BRIEF DESCRIPTION OF DRAWINGS

The technical solution in embodiments of the present invention will be further described more clearly and completely with the drawings of the present invention. Apparently, the drawings described herein are just for some embodiments of the present invention. On the basis of the drawings, other possible drawings can be made by those skilled in the art without any creative work.

DESCRIPTION OF EMBODIMENTS

The technical solutions in embodiments of the present invention will be further described more clearly and completely with the drawings of the present invention. Apparently, embodiments described herein are just some embodiments of the present invention. On the basis of embodiments of the invention, all other related embodiments made by those skilled in the art without any creative work belong to the scope of the invention.

The Java layer in the present invention includes a Java virtual machine and a program generated with Java codes; the C layer includes a program generated with C/C++ codes. Generally speaking, on an Android platform, the program generated with Java codes is included in a dex file, and the program generated with C/C++ codes is included in a so file.

Embodiment 1

Figure 1:
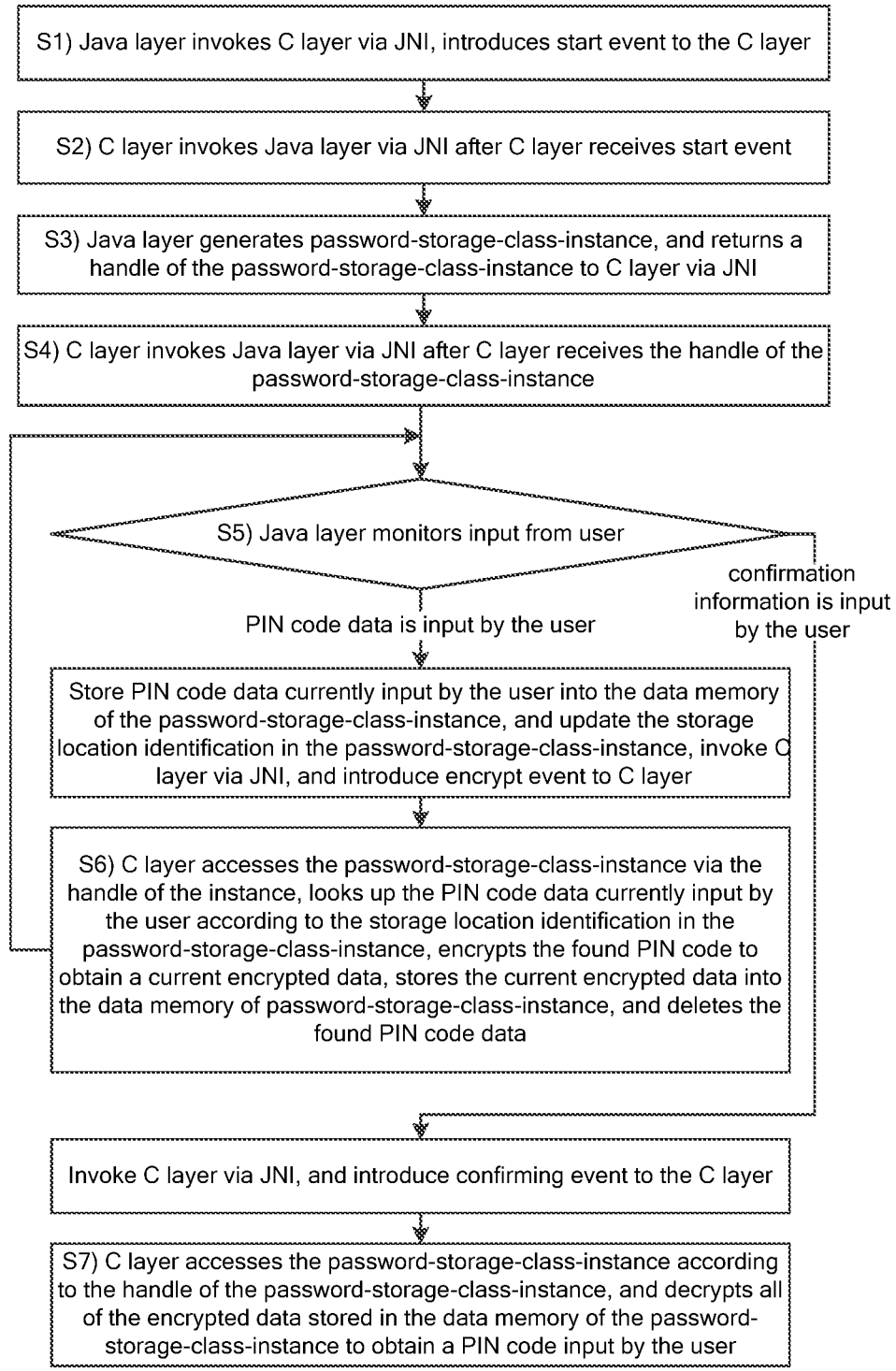
FIG. 1 provides a flow chart of a method for protecting a PIN code on an Android platform according to Embodiment 1 of the present invention.

A method for protecting a PIN code on an Android platform is provided according to Embodiment 1 of the present invention, as shown in FIG. 1, the method specifically includes:

Step S1) a C layer is invoked by a Java layer via a JNI, and a start event is introduced to the C layer;

Step S2) the Java layer is invoked by the C layer via the JNI after the start event is received by the C layer;

Step S3) a password-storage-class-instance is generated by the Java layer, and a handle of the password-storage-class-instance is returned to the C layer via the JNI;

Step S4) the Java layer is invoked by the C layer via the JNI after the handle of the password-storage-class-instance is received by the C layer;

Step S5) the Java layer monitors input from a user; if it is monitored that PIN code data is input by the user, the PIN code data currently input by the user is stored in a data memory of the password-storage-class-instance, a storage location identification in the password-storage-class-instance is updated, the C layer is invoked via the JNI, an encrypting event is introduced to the C layer, and Step S6 is executed; if it is monitored that confirmation information is input by the user, the C layer is invoked via the JNI, a confirming event is introduced to the C layer, and Step S7 is executed;

Step S6) the password-storage-class-instance is accessed by the C layer via the handle of the password-storage-class-instance; the PIN code data currently input by the user is looked up according to the storage location identification in the password-storage-class-instance; and then the found PIN code data currently input by the user is encrypted so as to obtain current encrypted data; the current encrypted data is stored into the data memory of the password-storage-class-instance, and the found PIN code data currently input by the user is deleted; and Step S5 is returned to;

Step S7) the password-storage-class-instance is accessed by the C layer according to the handle of the password-storage-class-instance, and all of the encrypted data stored in the data memory of the password-storage-class-instance is decrypted so as to obtain a PIN code input by the user.

In Embodiment 1, that the found PIN code data currently input by the user is encrypted specifically includes that: the found PIN code data currently input by the user is encrypted by using a pre-stored key according to a preset algorithm after the found PIN code data is filled with random numbers; correspondingly, that all of the encrypted data stored in the data memory of the password-storage-class-instance is decrypted specifically includes that: all of the encrypted data stored in the data memory of the password-storage-class-instance is decrypted by using the pre-stored key according to the preset algorithm;

or, in Embodiment 1, that the found PIN code data currently input by the user is encrypted specifically includes that: the found PIN code data currently input by the user is encrypted by using a current key according to a preset algorithm after the found PIN code data is filled with random numbers; correspondingly, after the start event is received by the C layer, the method further includes that: the current key is generated; that all of the encrypted data stored in the data memory of the password-storage-class-instance is decrypted specifically includes: all of the encrypted data stored in the data memory of the password-storage-class-instance is decrypted by using the current key according to the preset algorithm; after all of the encrypted data stored in the data memory of the password-storage-class-instance is decrypted, the current key is deleted.

Further, before Step S5, the method further includes that: an interface for user inputting is displayed by the Java layer through invoking a display function in the password-storage-class-instance; correspondingly, that the Java layer monitors the input from the user specifically includes that: the password-storage-class-instance of the Java layer monitors the input from the user;

or, before Step S5, the method further includes that: the Java layer generates a password-keyboard-class-instance, relates the password-keyboard-class-instance to the password-storage-class-instance, and invokes a display function in the password-keyboard-class-instance to display an interface for user inputting; correspondingly, that the Java layer monitors the input from the user specifically includes that: the password-keyboard-class-instance of the Java layer monitors the input from the user; that the Java layer stores the PIN code data currently input by the user into the data memory of the password-storage-class-instance and updates the storage location identification in the password-storage-class-instance specifically includes that: the password-keyboard-class-instance of the Java layer invokes the password-storage-class-instance, stores the PIN code data currently input by the user into the data memory of the password-storage-class-instance, and updates the storage location identification in the password-storage-class-instance;

or, Step S1 further includes that: the Java layer generates a password-keyboard-class-instance, invokes a display function in the password-keyboard-class-instance to display an interface for user inputting; correspondingly, before Step S5, the method further includes that: the Java layer relates the password-keyboard-class-instance to the password-storage-class-instance; that the Java layer monitors the input from the user specifically includes that: the password-keyboard-class-instance of the Java layer monitors the input from the user; that the Java layer stores the PIN code data currently input by the user into the data memory of the password-storage-class-instance, and updates the storage location identification in the password-storage-class-instance specifically includes that: the password-keyboard-class-instance of the Java layer invokes the password-storage-class-instance, stores the PIN code data currently input by the user into the data memory of the password-storage-class-instance, and updates the storage location identification in the password-storage-class-instance.

Embodiment 2

Figure 2:
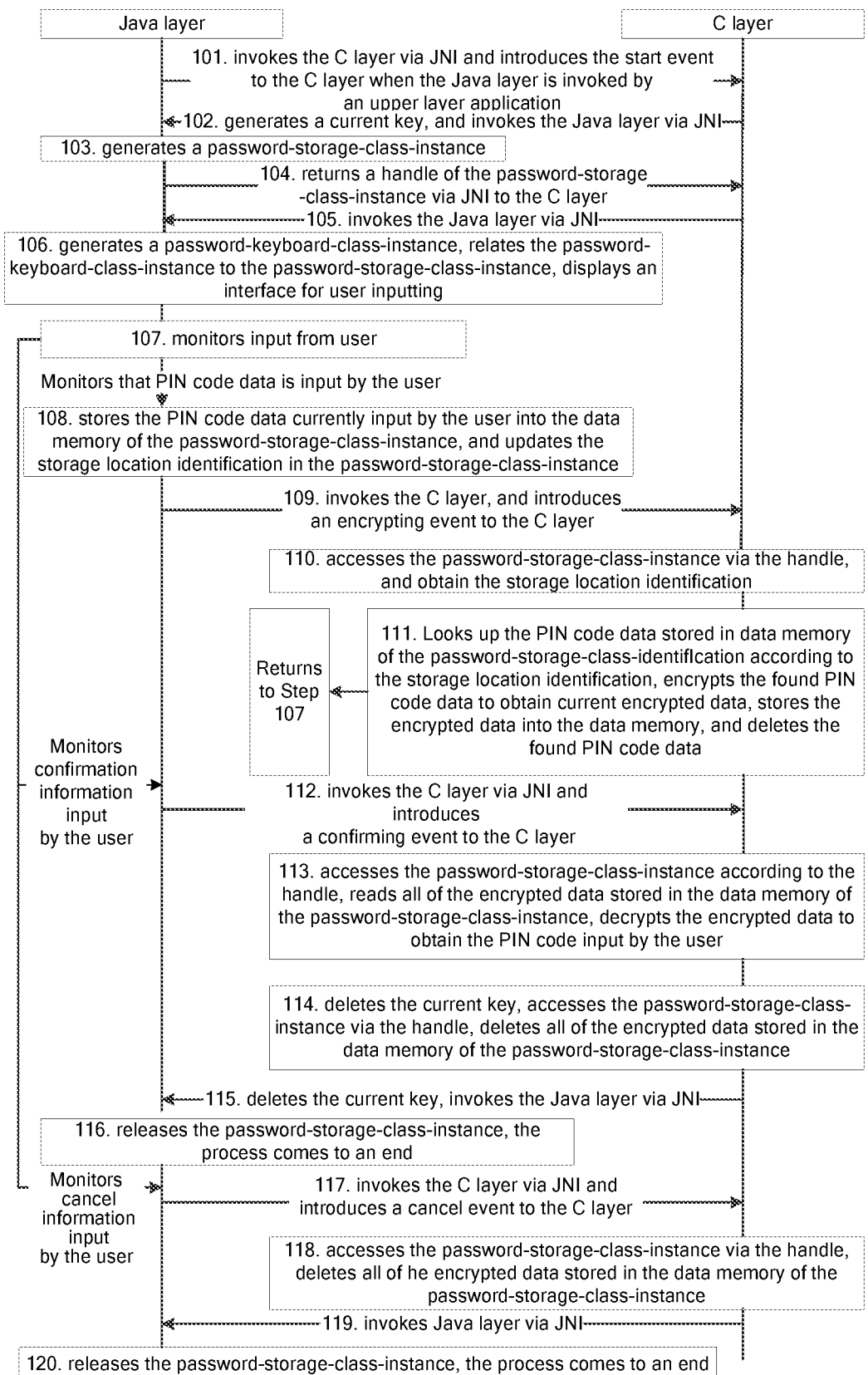
FIG. 2 provides a flow chart of a method for protecting a PIN code on an Android platform according to Embodiment 2 of the present invention.

A method for protecting a PIN code on an Android platform is provided according to Embodiment 2 of the present invention, as shown in FIG. 2, the method specifically includes:

Step 101, a Java layer invokes a C layer via a JNI and introduces a start event to the C layer when upper layer application invoking is received by the Java layer.

The JNI, which is a Java native interface, enables Java codes running in a Java virtual machine to interact with application programs written with other program languages, such as C, C++ or assembly language, and a library.

Specifically, that the Java layer introducing the event to the C layer can be the Java layer introducing corresponding event data to the C layer; if only the Java layer and the C layer can work according to the commitment, a type of the event data has multiple implementation modes and a value of the data can be defined randomly.

For instance, each event related to this embodiment is a series of jint type data predefined by the Java layer and the C layer, in which, the start event is defined as integer 1 of the jint type, the encrypting event is defined as integer 2 of the jint type, the confirming event is defined as integer 3 of the jint type, and the cancel event is defined as integer 4 of the jint type.

Step 102, the C layer generates a current key, and invokes the Java layer via the JNI.

In Embodiment 2, the C layer generates random numbers with a preset length and makes the random numbers as the current key.

Step 103, the Java layer generates a password-storage-class-instance.

In Embodiment 2, Step 102 and Step 103 can specifically be that: the C layer enables, by invoking a NewObject function of the JNI, the Java layer to generate a password-storage-class-instance according to a password storage class, and the password-storage-class-instance includes logic of storing data input by the user and logic of introducing an event to the C layer via the JNI.

Step 104, the Java layer returns a handle of the password-storage-class-instance to the C layer via the JNI.

Step 105, the C layer invokes the Java layer via the JNI.

Step 106, the Java layer generates a password-keyboard-class-instance, relates the password-keyboard-class-instance to the password-storage-class-instance, and displays an interface for user inputting.

In Embodiment 2, specifically, the Java layer generates a password-keyboard-class-instance by invoking an initializing function in the password storage class; and the Java layer relates the password-keyboard-class-instance to the password-storage-class-instance by assigning the handle of the password-storage-class-instance in the password-keyboard-class-instance.

In Embodiment 2, the Java layer displays the interface for user inputting by invoking a display function in the password-keyboard-class-instance; generally speaking, the inputting interface includes an inputting box and a keyboard, both of which can be user-defined, be with the system or be implemented by the third party; the display function of the password-keyboard-class-instance displays the inputting interface by invoking these implemented display interfaces when the inputting box and the keyboard are with the system or implemented by the third party.

Step 107, the Java layer monitors input from the user; Step 108 is executed if it is monitored that PIN code data is input by the user; Step 112 is executed if it is monitored that the confirm information is input by the user; Step 117 is executed if it is monitored that the cancel information is input by the user.

In Embodiment 2, specifically, the password-keyboard-class-instance of the Java layer monitors the input from the user.

Further, Step 107 also includes that: if it is monitored that deleting information is input by the user, after the storage location identification in the password-storage-class-instance is decreased progressively, the latest PIN code data input by the user is looked up according to the storage location identification and is deleted.

Step 108, the Java layer stores the PIN code data currently input by the user into the data memory of the password-storage-class-instance, and updates the storage location identification in the password-storage-class-instance.

Where, the data memory of the password-storage-class-instance is used to store data, such as the PIN code data input by the user and encrypted data which is obtained by encrypting the PIN code data input by the user; the storage location identification is a variable in the password-storage-class-instance, which is used to indicate a location in the data memory where the PIN code data currently input by the user is stored.

In Embodiment 2, specifically, the password-keyboard-class-instance of the Java layer invokes the password-storage-class-instance related to the password-keyboard-class-instance to store the PIN code data currently input by the user into the data memory of the password-storage-class-instance, and updates the storage location identification in the password-storage-class-instance.

Specifically, a memory structure, which is used to store the PIN code data input by the user, can be implemented in any mode. In Embodiment 2, preferably, a mode of two-dimensional array is used.

For instance, the data memory of the password-storage-class-instance specifically is a two-dimensional array pin [8][8], in which, line 0 of pin [8][8] is used to store data input by the user; if the storage location identification is p_current, and the PIN code data currently input by the user is 0x31 which means that the user triggers a number key 1, then the Java layer stores the PIN code data 0x31, which is currently input by the user, into pin[p_current][0] of the two-dimension array and updates the storage location identification p_current=p_current+1.

Step 109, the Java layer invokes the C layer via the JNI, and introduces an encrypting event to the C layer.

Further, in Embodiment 2, before Step 109, the method further includes that: the Java layer determines whether the length of data to be encrypted reaches a preset length, if yes, Step 109 is executed; otherwise, Step 107 is executed; correspondingly, Step 108 further includes that: the length of the data to be encrypted is updated, and Step 106 and Step 109 further include that: the length of the data to be encrypted is initialized.

Step 110, the C layer accesses the password-storage-class-instance via the handle of the password-storage-class-instance and obtains the storage location identification.

Step 111, the C layer looks up the PIN code data currently input by the user, which is stored in the data memory of the password-storage-class-instance, according to the storage location identification, encrypts the found PIN code data currently input by the user to obtain current encrypted data, stores the current encrypted data into the data memory of the password-storage-class-instance, deletes the found PIN code data currently input by the user, and returns to Step 107.

Specifically, the PIN code data currently input by the user can be encrypted in a random way. In Embodiment 2, preferably, the PIN code data currently input by the user is filled with random numbers, and then the obtained PIN code data is encrypted integrally by using the current key according to RC4 algorithm.

For instance, the data memory of the password-storage-class-instance specifically is the two-dimension array pin [8][8], the line 0 of pin [8] [8] is used to store data input by the user; if the storage location identification is p_current, then the PIN code data currently input by the user is stored at pin [p_current−1] [0]; that the PIN code data currently input by the user is encrypted so as to obtain the current encrypted data, the current encrypted data is stored into the data memory of the password-storage-class-instance, and the PIN code data currently input by the user is deleted, specifically includes that: random numbers are filled in pin [p_current−1] [1] to pin [p_current−1] [7], the data in pin [p_current−1] [0] to pin [p_current−1] [7] is encrypted by using RC4 algorithm according to the key to obtain the current encrypted data, and the current encrypted data is stored in pin [p_current−1] [0] to pin [p_current−1] [7].

Step 112, the Java layer invokes the C layer via the JNI, and introduces a confirming event to the C layer.

Step 113, the C layer accesses the password-storage-class-instance according to the handle of the password-storage-class-instance, reads all of the encrypted data stored in the data memory of the password-storage-class-instance, and decrypts the read encrypted data to obtain the PIN code input by the user.

In the above instance, the data memory of the password-storage-class-instance specifically is the two-dimension array pin [8] [8], the line 0 of pin [8] [8] is used to store the data input by the user; the encrypted data, which is obtain by encrypting the PIN code data currently input by the user, is used to cover the PIN code data currently input by the user and stored in lines from line 0 to line 7 of the current row; if the storage location identification is p_current, the C layer reads the data in pin [0] [0] to pin [p_current−1][7] to obtain all of the encrypted data, and decrypts the data in pin [0] [0] to pin [p_current−1] [7] with RC4 algorithm according to the key to obtain the PIN code input by the user.

Further, after the PIN code input by the user is obtained by the C layer, the PIN code input by the user is operated correspondingly according to a specific scenario of the implemented application, no specific limitation in Embodiment 2; for instance, the PIN code input by the user can be sent to a smart key device for authentication, etc.

Step 114, the C layer deletes the current key, accesses the password-storage-class-instance according to the handle of the password-storage-class-instance, and deletes all of the encrypted data stored in the data memory of the password-storage-class-instance.

In the above instance, the data memory of the password-storage-class-instance specifically is the two-dimension array pin [8] [8], the line 0 of pin [8] [8] is used to store the data input by the user; the encrypted data, which is obtained by encrypting the PIN code currently input by the user, is used to cover the PIN code data currently input by the user and stored in lines from line 0 to line 7 of the current row; if the storage location identification is p_current, then the C layer deletes the data in pin [0] [0] to pin [p_current−1] [7]; in which, that deleting the data in pin [0] [0] to pin [p_current−1] [7] can be that all of the data in pin [0] [0] to pin [p_current−1] [7] is updated as 0, can also be that random numbers are filled in pin [0] [0] to pin [p_current−1] [7], in Embodiment 2, preferably, the random numbers are filled in pin [0] [0] to pin [p_current−1] [7].

Step 115, the C layer deletes the current key, and introduces the Java layer via the JNI.

Step 116, the Java layer releases the password-storage-class-instance, and the process comes to an end.

In Embodiment 2, Step 115 and Step 116 specifically include that: the C layer invokes a DeleteGlobalRef function of the JNI by taking the handle of the password-storage-class-instance as a parameter to enable the Java layer to release the password-storage-class-instance.

Step 117, the Java layer invokes the C layer via the JNI, and introduces a cancel event to the C layer.

Step 118, the C layer accesses the password-storage-class-instance via the handle of the password-storage-class-instance, and deletes all of the encrypted data stored in the data memory of the password-storage-class-instance.

Step 119, the C layer invokes the Java layer via the JNI.

Step 120, the Java layer releases the password-storage-class-instance, and the process comes to an end.

In Embodiment 2, Step 119 and Step 120 specifically include that: the C layer invokes the DeleteGlobalRef function of the JNI by taking the handle of the password-storage-class-instance as a parameter to enable the Java layer to release the password-storage-class-instance.

Embodiment 3

Figure 3:
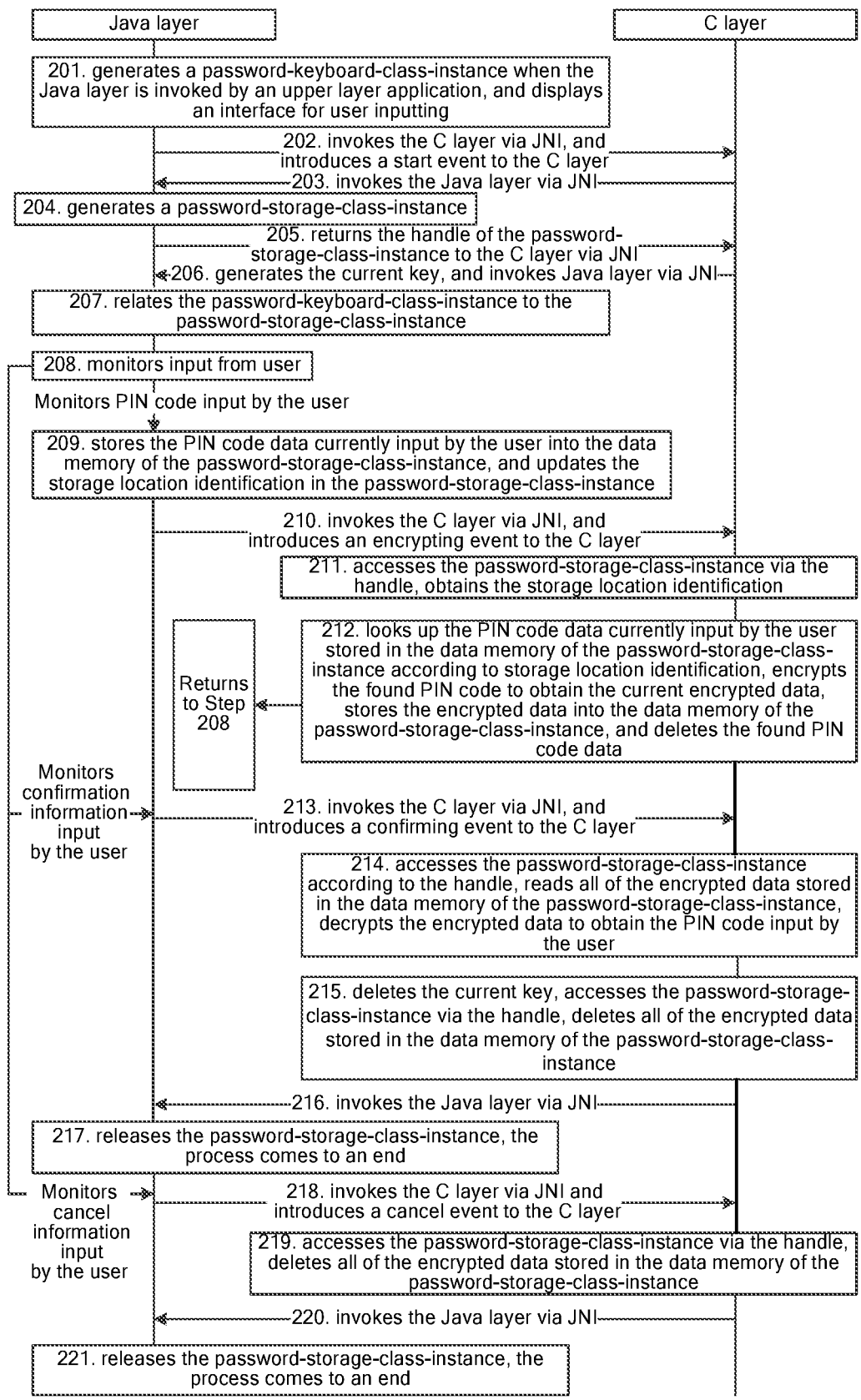
FIG. 3 provides a flow chart of a method for protecting a PIN code on an Android platform according to Embodiment 3 of the present invention.

A method for protecting a PIN code on an Android platform is provided according to Embodiment 3 of the present invention, as shown in FIG. 3, the method specifically includes:

Step 201, a Java layer generates a password-keyboard-class-instance and displays an interface for user inputting when upper layer application invoking is received by the Java layer.

In Embodiment 3, specifically, the Java layer generates a password-keyboard-class-instance by invoking an initializing function in a password storage class.

In Embodiment 3, the Java layer can display the interface for user inputting by invoking a display function in the password-keyboard-class-instance; generally speaking, the inputting interface includes an inputting box and a keyboard, both of which can be user-defined, be with the system or be implemented by the third party; the display function of the password-keyboard-class-instance displays the inputting interface by invoking these implemented display interfaces when the inputting box and the keyboard are with the system or implemented by the third party.

Step 202, the Java layer invokes the C layer via the JNI, and introduces a start event to the C layer.

Step 203, the C layer invokes the Java layer via the JNI.

Step 204, the Java layer generates a password-storage-class-instance.

In Embodiment 3, Step 203 and Step 204 can specifically include that: the C layer enables, by invoking a NewObject function of the JNI, the Java layer to generate a password-storage-class-instance according to the password storage class, and the password-storage-class-instance includes logic of storing data input by the user and logic of introducing an event to the C layer via the JNI.

Step 205, the Java layer returns a handle of the password-storage-class-instance to the C layer via the JNI.

Step 206, the C layer generates a current key, and invokes the Java layer via the JNI.

In Embodiment 3, the C layer generates random numbers with a preset length and makes the random numbers as the current key.

Step 207, the Java layer relates the password-keyboard-class-instance to the password-storage-class-instance.

In Embodiment 3, specifically, the Java layer relates the password-keyboard-class-instance to the password-storage-class-instance by assigning the handle of the password-storage-class-instance in the password-keyboard-class-instance.

Step 208, the Java layer monitors input from the user; Step 209 is executed if it is monitored that PIN code data is input by the user; Step 213 is executed if it is monitored that confirmation information is input by the user; Step 218 is executed if it is monitored that cancel information is input by the user.

In Embodiment 3, specifically, the password-keyboard-class-instance of the Java layer monitors the input from the user.

Further, Step 208 also includes that: if it is monitored that deleting information is input by the user, after a storage location identification is decreased progressively, the latest PIN code data input by the user is looked up according to the storage location identification and is deleted.

Step 209, the Java layer stores the PIN code data currently input by the user into a data memory of the password-storage-class-instance, and updates the storage location identification in the password-storage-class-instance.

Where, the data memory of the password-storage-class-instance is used to store data, such as the PIN code data input by the user and encrypted data which is obtained by encrypting the PIN code data input by the user; the storage location identification is a variable in the password-storage-class-instance, which is used to indicate a location in the data memory where the PIN code data currently input by the user is stored.

In Embodiment 3, specifically, the password-keyboard-class-instance of the Java layer invokes the password-storage-class-instance, which is related to the password-keyboard-class-instance, to store the PIN code data currently input by the user into the data memory of the password-storage-class-instance, and updates the storage location identification of the password-storage-class-instance.

Specifically, a memory structure, which is used to store PIN code data input by the user, can be realized in any mode, there is no limitation in this embodiment.

Step 210, the Java layer invokes the C layer via the JNI, and introduces an encrypting event to the C layer.

Further, in Embodiment 3, before Step 210, the method further includes that: the Java layer determines whether the length of data to be encrypted reaches a preset length, if yes, Step 210 is executed; otherwise, Step 208 is executed; correspondingly, Step 209 further includes that the length of the data to be encrypted is updated, and both Step 207 and Step 210 further include that the length of the data to be encrypted is initialized.

Step 211, the C layer accesses the password-storage-class-instance via the handle of the password-storage-class-instance and obtains the storage location identification.

Step 212, the C layer looks up the PIN code data currently input by the user, which is stored in the data memory of the password-storage-class-instance, according to the storage location identification, encrypts the found PIN code data currently input by the user to obtain the current encrypted data, stores the current encrypted data into the data memory of the password-storage-class-instance, deletes the found PIN code data currently input by the user, and returns to Step 208.

Specifically, the PIN code data currently input by the user can be encrypted in any mode.

Step 213, the Java layer invokes the C layer via the JNI, and introduces a confirming event to the C layer.

Step 214, the C layer accesses the password-storage-class-instance according to the handle of the password-storage-class-instance, reads all of the encrypted data stored in the data memory of the password-storage-class-instance, and decrypts the read encrypted data to obtain the PIN code input by the user.

Further, after the C layer obtains the PIN code input by the user, the method includes that: the PIN code input by the user is operated according to a specific scenario of the implemented application, there is no limitation in this embodiment.

Step 215, the C layer deletes the current key, accesses the password-storage-class-instance via the handle of the password-storage-class-instance, and deletes all of the encrypted data stored in the data memory of the password-storage-class-instance.

Step 216, the C layer invokes the Java layer via the JNI.

Step 217, the Java layer releases the password-storage-class-instance, and the process comes to an end.

In Embodiment 3, Step 216 and Step 217 specifically include that: the C layer invokes a DeleteGlobalRef function of the JNI by taking the handle of the password-storage-class-instance as a parameter to enable the Java layer to release the password-storage-class-instance.

Step 218, the Java layer invokes the C layer via the JNI, and introduces a cancel event to the C layer.

Step 219, the C layer accesses the password-storage-class-instance via the handle of the password-storage-class-instance, and deletes all of the encrypted data stored in the data memory of the password-storage-class-instance.

Step 220, the C layer invokes the Java layer via the JNI.

Step 221, the Java layer releases the password-storage-class-instance, and the process comes to an end.

In Embodiment 3, Step 220 and Step 221 specifically include that: the C layer invokes the DeleteGlobalRef function of the JNI by taking the handle of the password-storage-class-instance as a parameter to enable the Java layer to release the password-storage-class-instance.

What is claimed is:

1. A method for protecting a personal identification number (PIN code) on an Android platform, comprising:
    step S1) invoking, by a Java layer, a C layer via a Java native interface (JNI), and introducing a start event to the C layer;
    step S2) invoking, by the C layer, the Java layer via the JNI after the start event is received by the C layer;
    step S3) generating, by the Java layer, a password-storage-class-instance, and returning a handle of the password-storage-class-instance to the C layer;
    step S4) invoking, by the C layer, the Java layer via the JNI after the handle of the password-storage-class-instance is received by the C layer;
    step S5) monitoring, by the Java layer, input from a user; if it is monitored that PIN code data is input by the user, storing the PIN code data currently input by the user into a data memory of the password-storage-class-instance, and updating a storage location identification in the password-storage-class-instance, invoking the C layer via the JNI, introducing an encrypting event to the C layer, and executing step S6; if it is monitored that confirmation information is input by the user, invoking the C layer via the JNI, introducing a confirming event to the C layer, and executing step S7;
    step S6) accessing, by the C layer, the password-storage-class-instance via the handle of the password-storage-class-instance, looking up the PIN code data currently input by the user according to the storage location identification in the password-storage-class-instance, encrypting the found PIN code data currently input by the user to obtain current encrypted data, storing the current encrypted data into the data memory of the password-storage-class-instance, deleting the found PIN code data currently input by the user, and returning to the step S5;
    step S7) accessing, by the C layer, the password-storage-class-instance according to the handle of the password-storage-class-instance, and decrypting all of the encrypted data stored in the data memory of the password-storage-class-instance to obtain a PIN code input by the user.

2. The method as claimed in claim 1, wherein, before the step S5, the method further comprises:

displaying, by the Java layer, an interface for user inputting by invoking a display function in the password-storage-class-instance;

the monitoring, by the Java layer, the input from the user comprises: monitoring, by the password-storage-class-instance of the Java layer, the input from the user.

3. The method as claimed in claim 1, wherein, before the step S5, the method further comprises:

generating, by the Java layer, a password-keyboard-class-instance, relating the password-keyboard-class-instance to the password-storage-class-instance, and invoking a display function in the password-keyboard-class-instance to display an interface for user inputting.

4. The method as claimed in claim 1, wherein, the step S1 further comprises:

generating, by the Java layer, a password-keyboard-class-instance, and invoking a display function in the password-keyboard-class-instance to display an interface for user inputting;

before the step S5, the method further comprises: relating, by the Java layer, the password-keyboard-class-instance to the password-storage-class-instance.

5. The method as claimed in claim 3, wherein, the monitoring, by the Java layer, the input from the user comprises:

monitoring, by the password-keyboard-class-instance of the Java layer, the input from the user;

the storing the PIN code data currently input by the user into the data memory of the password-storage-class-instance, and updating the storage location identification of the password-storage-class-instance comprises:

invoking, by the password-keyboard-class-instance of the Java layer, the password-storage-class-instance, storing the PIN code data currently input by the user into the data memory of the password-storage-class-instance, and updating the storage location identification in the password-storage-class instance.

6. The method as claimed in claim 1, wherein, the step S5 further comprises:

if the Java layer monitors cancel information being input by the user, invoking the C layer via the JNI and introducing a cancel event to the C layer; accessing, by the C layer, the password-storage-class-instance according to the handle of the password-storage-class-instance after the cancel event is received by the C layer, and deleting all of the encrypted data in the data memory of the password-storage-class-instance.

7. The method as claimed in claim 6, wherein, after the step S7, the method further comprises:

invoking, by the C layer, the Java layer via the JNI, and releasing, by the Java layer, the password-storage-class-instance;

after the accessing, by the C layer, the password-storage-class-instance according to the handle of the password-storage-class-instance, and deleting all of the encrypted data in the data memory of the password-storage-class-instance, the method further comprises:

invoking the Java layer via the JNI, and releasing, by the Java layer, the password-storage-class-instance.

8. The method as claimed in claim 1, wherein, the step S5 further comprises:

if the Java layer monitors deleting information being input by the user, looking up and deleting the latest PIN code data input by the user according to the storage location identification after the storage location identification in the password-storage-class-instance is decreased progressively, and returning to the step S5.

9. The method as claimed in claim 1, wherein, the encrypting the found PIN code data currently input by the user comprises:

encrypting the found PIN code data currently input by the user by using a pre-stored key according to a preset algorithm after the found PIN code data currently input by the user is filled with a random number;

the decrypting all of the encrypted data stored in the data memory of the password-storage-class-instance comprises:

decrypting all of the encrypted data stored in the data memory of the password-storage-class-instance by using the pre-stored key according to the preset algorithm.

10. The method as claimed in claim 1, wherein, after the C layer receives the start event, the method further comprises:

generating a current key;

the encrypting the found PIN code data currently input by the user comprises:

encrypting the found PIN code data currently input by the user by using the current key according to a preset algorithm after the found PIN code data is filled with a random number;

the decrypting all of the encrypted data stored in the data memory of the password-storage-class-instance comprises:

decrypting all of the encrypted data stored in the data memory of the password-storage-class-instance by using the current key according to the preset algorithm;

after all of the encrypted data stored in the data memory of the password-storage-class-instance is decrypted to obtain the PIN code input by the user, the method further comprises:

deleting the current key.

11. The method as claimed in claim 1, wherein after all of the encrypted data stored in the data memory of the password-storage-class-instance is decrypted to obtain the PIN code input by the user, the method further comprises:

sending the PIN code input by the user to a smart key device for authentication.

12. The method as claimed in claim 1, wherein, the storing the current encrypted data into the data memory of the password-storage-class-instance, and deleting the found PIN code data currently input by the user, comprises:

covering the found PIN code data currently input by the user with the current encrypted data.

13. The method as claimed in claim 1, wherein before the Java layer invokes the C layer via the JNI and introduces the encrypting event to the C layer, the method further comprises:

determining, by the Java layer, whether a length of data to be encrypted reaches a preset length, if yes, invoking the C layer and introducing the encrypting event to the C layer; otherwise, returning to the step S5;

after the Java layer stores the PIN code data currently input by the user into the data memory of the password-storage-class-instance, the method further comprises:

updating the length of the data to be encrypted;

after the Java layer invokes the C layer via the JNI and introduces the confirming event to the C layer, the method further comprises:

initializing, by the Java layer, the length of the data to be encrypted.

14. The method as claimed in claim 1, wherein after all of the encrypted data stored in the data memory of the password-storage-class-instance is decrypted to obtain the PIN code input by the user, the method further comprises:
deleting all of the encrypted data.

15. The method as claimed in claim 14, wherein the deleting all of the encrypted data comprises:
updating all of the encrypted data stored in the data memory of the password-storage-class-instance as pre-set data.

16. The method as claimed in claim 14, wherein the deleting all of the encrypted data comprises:
updating all of the encrypted data stored in the data memory of the password-storage-class-instance as random numbers.

* * * * *